(12) United States Patent
Porten (10) Patent No.: US 12,509,042 B2
(45) Date of Patent: Dec. 30, 2025

(54) HYDRAULIC SYSTEM FOR A BRAKE RELEASE DEVICE, BRAKE RELEASE DEVICE WITH SUCH A HYDRAULIC SYSTEM AND BRAKE SYSTEM (71) Applicant: HAWE Hydraulik SE, Aschheim (DE)

(72) Inventor: Oliver Porten, Aschheim (DE)

(73) Assignee: HAWE Hydraulik SE, Aschheim (DE)

( * ) Notice: Subject to any disclaimer, the term of this patent is extended or adjusted under 35 U.S.C. 154(b) by 455 days.

(21) Appl. No.: 18/067,464

(22) Filed: Dec. 16, 2022

(65) Prior Publication Data
US 2023/0192053 A1 Jun. 22, 2023

(30) Foreign Application Priority Data
Dec. 17, 2021 (DE) ...................... 10 2021 214 583.3

(51) Int. Cl.
B60T 13/16 (2006.01)
B60T 13/22 (2006.01)
B60T 17/22 (2006.01)
F15B 11/08 (2006.01)
F15B 13/04 (2006.01)
F15B 13/042 (2006.01)
F15B 15/18 (2006.01)
B60T 13/68 (2006.01)
F15B 11/10 (2006.01)

(52) U.S. Cl.
CPC ............ B60T 13/168 (2013.01); B60T 13/22 (2013.01); B60T 17/222 (2013.01); F15B 11/08 (2013.01); F15B 13/0426 (2013.01); F15B 15/18 (2013.01); B60T 13/686 (2013.01); F15B 11/10 (2013.01); F15B 2211/30525 (2013.01)

(58) Field of Classification Search
CPC .......... B60T 13/22; F15B 15/18; F15B 11/08; F15B 11/10; F15B 13/0426
See application file for complete search history.

(56) References Cited

U.S. PATENT DOCUMENTS

| 2,668,661 | A |  | 2/1954  | Stibitz |  |
|---|---|---|---|---|---|
| 3,549,209 | A |  | 12/1970 | Moericke |  |
| 3,976,333 | A |  | 8/1976  | Fillion |  |
| 4,451,095 | A |  | 5/1984  | Chichester |  |
| 4,586,332 | A | * | 5/1986  | Schexnayder | .......... F15B 11/08 60/494 |

(Continued)

FOREIGN PATENT DOCUMENTS

| CN | 110719864 A | 1/2020 |
|---|---|---|
| CN | 214728744 U | 11/2021 |

(Continued)

OTHER PUBLICATIONS

EPO translation FR-30022991-A1 (Year: 2014).*

Primary Examiner — Thomas J Williams
(74) Attorney, Agent, or Firm — Dinsmore & Shohl LLP (57) ABSTRACT A hydraulic system for a brake release device has a pump device, a tank, a valve assembly and at least one working port, where the working port is connectable to the tank or the pump device via the valve assembly. The pump device is switchable between an operating mode and a shutdown mode, where the valve assembly connects the working port to the tank in the shutdown mode and the valve assembly is only hydraulically operable. A brake release device having such a hydraulic system is also disclosed.

16 Claims, 6 Drawing Sheets (56) References Cited

U.S. PATENT DOCUMENTS

| | | | |
|---|---|---|---|
| 4,947,518 A | 8/1990 | Covell, III | |
| 4,961,248 A | 10/1990 | Criscione, II et al. | |
| 6,367,365 B1 * | 4/2002 | Weickert | F15B 11/05 |
| | | | 91/447 |
| 6,675,576 B2 * | 1/2004 | Bigo | F16H 61/4043 |
| | | | 60/494 |
| 10,822,772 B1 * | 11/2020 | Wright | E02F 9/2232 |
| 11,180,244 B2 * | 11/2021 | Evans | F15B 15/06 |
| 2013/0004279 A1 * | 1/2013 | Naito | B60T 13/22 |
| | | | 188/170 |
| 2020/0173145 A1 | 6/2020 | Ogawa | |
| 2023/0192053 A1 * | 6/2023 | Porten | B60T 13/22 |
| | | | 303/11 |

FOREIGN PATENT DOCUMENTS

| | | | | |
|---|---|---|---|---|
| DE | 102019108411 A1 | 10/2020 | | |
| EP | 875681 B1 | 7/2003 | | |
| EP | 3401270 A1 | 11/2018 | | |
| EP | 3003807 B1 | 2/2019 | | |
| FR | 2542680 A1 * | 9/1984 | | B60T 13/22 |
| FR | 3002991 A1 * | 9/2014 | | B60T 1/005 |
| GB | 2427664 A | 1/2007 | | |
| WO | WO-2004028879 A1 * | 4/2004 | | B60K 31/08 |

\* cited by examiner

Fig. 6

HYDRAULIC SYSTEM FOR A BRAKE RELEASE DEVICE, BRAKE RELEASE DEVICE WITH SUCH A HYDRAULIC SYSTEM AND BRAKE SYSTEM

CROSS-REFERENCE TO RELATED APPLICATIONS

This application claims priority to German Application 10 2021 214 583.3, filed Dec. 17, 2021, which is hereby incorporated by reference in its entirety.

FIELD OF THE INVENTION

The present invention relates to a hydraulic system for a brake release device or a brake system, and to a brake release device comprising such a hydraulic system. Furthermore, the invention relates to a brake system comprising such a hydraulic system.

BACKGROUND OF THE INVENTION

Such brake release devices and brake systems are known from the prior art, for example from EP 3 401 270 A1, DE 10 2019 108 411 A1 or EP 3 003 807 B1. Such brake release devices are regularly used in brakes of large systems for material handling, for example container cranes, casting cranes, forklift cranes or even conveyor systems. The service brakes or safety brakes of these systems are configured to operate according to a fail-safe principle. The brake release devices used for this purpose can release the brake if a sufficient power supply is guaranteed. In the event of a failure of the energy supply, free movement must be ensured so that the brake of the system is closed, for example, via a spring force.

To realize this fail-safe function, hydraulic systems are regularly used to release the brake, in which an actuating cylinder or the external hydraulic brake is directly connected to a working port. The actuating cylinder or the external brake is pressurized via a pump device when there is sufficient power supply. For this purpose, the actuating cylinder or the external hydraulic brake has at least one pressure chamber and at least one piston rod movable between an initial position (usually fully retracted position) and an end position (usually fully extended position). The working port and consequently the pressure chamber can either be pressurized via the pump device or connected to the tank for relief via a valve assembly. When pressurized, the piston rod moves to the end position and releases the brake. The piston rod remains in the end position as long as a sufficient energy supply is ensured or the brake is not intentionally applied. If the power supply fails, the pressure chamber is relieved via the valve assembly to the tank and the piston rod moves to the initial position to apply the brake.

In the state of the art, the valve assembly for this purpose usually has electrohydraulically actuated directional control valves. When energized, these are switched in such a way that the connection between the pressure chamber and the tank is blocked. As soon as the directional control valves are no longer energized, they are switched so that the pressure chamber is connected to the tank and thus relieved. This makes it possible to provide a reliable brake release device that operates according to the fail-safe principle.

However, these brake release devices with electromagnetically actuated directional control valves are relatively large and also expensive due to the electromagnetic actuation and the associated sensor technology. Furthermore, the brake release devices known from the prior art have an increased energy consumption due to low efficiency.

SUMMARY OF THE INVENTION

It is therefore the object of the present invention to provide an improved hydraulic system for a brake release device or a brake system, which is characterized by a cost efficient and space-saving configuration and an improved efficiency. The problem is solved with a hydraulic system as disclosed herein. Preferable embodiments are also disclosed. The hydraulic system according to the invention is distinguished from hydraulic systems known in the prior art in that the pump device is switchable between an operating mode and a shutdown mode, wherein the valve assembly connects the working port to the tank in the shutdown mode in that the valve assembly is only hydraulically operable. In other words, when the power supply fails, the pump device goes into the shutdown mode. The shutdown mode within the meaning of the application is therefore generally understood to be a state in which the pump device does not pump, in particular in the event of a failure of the power supply. Due to the then collapsing pressure, the valve assembly operated via the pump pressure in the operating mode is then switched in such a way that the working port to the tank is relieved. Due to the purely hydraulic actuation of the valve assembly, expensive electromagnetic actuation can thus be omitted. Furthermore, this results in a higher efficiency, a simpler design and an overall lower space requirement.

Preferably, the valve assembly has a circulation device and the pump device comprises a first pump element and a second pump element. The circulation device connects the first pump element to the tank when a limit pressure is reached at the working port, and the second pump element hydraulically controls the valve assembly in such a way that the limit pressure is maintained at the working port when the first pump element is connected to the tank by the circulation device. The limit pressure corresponds in particular to the pressure required to move the piston rod to the end position and hold it there. Thus, the first pump element is configured in particular to move the piston rod into the end position with a high volume flow. As soon as the end position of the piston rod and thus the limit pressure at the working port is reached, the power is reduced by switching the first pump element to circulation via the circulation device and only the second pump element maintains the pressure level in the entire hydraulic system in such a way that the piston rod remains in the end position by maintaining the limit pressure at the working port. In particular, a pump element with a flow rate that is just sufficient for this and thus lower than the flow rate of the first pump element is used for this purpose. This results in improved energy consumption. The term "pump element" within the meaning of the application is to be understood broadly and includes both structurally individually configured pumps and pump elements integrated in a common pump component.

Preferably, the second pump element is connected to the tank via at least one leakage point. The leakage point can be used to ensure that any residual pressure in the hydraulic system is reliably reduced and that the piston rod of the actuating cylinder connected to the working port or of the external hydraulic brake connected to the working port thus moves to the initial position in the event of a power supply failure or when switching the pump device to shutdown mode. The leakage point can be an external leakage point, or a leakage point integrated in the pump element. The leakage point can also occur in the pump element due to its configuration, for example due to internal leakage when using a flow pump, centrifugal pump or impeller pump.

Preferably, the first pump element and the second pump element are connected to the valve assembly via a common pressure line. Thus, both the first pump element and the second pump element deliver into a common working circuit. Therefore, no separate control pressure circuit is necessary, resulting in reduced complexity overall.

Preferably, the valve assembly is connected to the tank via a relief line, the pressure line being connected to the relief line via at least one leakage line. As soon as the first pump element is switched to recirculation, only the second pump element delivers into the pressure line and controls the valve assembly hydraulically in such a way that the limit pressure at the working port is maintained and the piston rod remains in the end position. Furthermore, the second pump element supplies the leakage at the leakage line. If the power supply fails or the pump device goes into shutdown mode, the leakage is no longer supplied to the leakage line. This ensures that the residual pressure in the pressure line drops due to the relief via the leakage line and that the valve assembly is no longer hydraulically controlled via the second pump element. For reasons of redundancy, it is also conceivable that two or more parallel leakage lines are provided.

Preferably, the valve assembly comprises at least one hydraulically operable pressure switch, wherein the pressure switch connects the pump device to the pressure chamber in the operating mode and wherein the pressure switch connects the pressure chamber to the tank in the shutdown mode. A pressure switch is a simply constructed hydraulic component that provides reliable switching between the tank and the pump device. It is also conceivable that two or more parallel pressure switches are provided to allow the necessary redundancy in the event of a failure of one pressure switch.

Alternatively, the first pump element can be connected to the valve assembly via a pressure line and the second pump element can be connected to the valve assembly via a control line arrangement. This results in a control pressure circuit separate from the working circuit. This has the advantage that the second pump element only has to provide a control pressure and can therefore be of simpler construction.

In this regard, it is preferable if the valve assembly has at least one 2/2-way directional valve for connecting the working port to the tank, the 2/2-way directional valve being connected to the control line arrangement on the closing side and being spring-loaded on the opening side. It is also conceivable that the pressure in the pressure line acts alternatively or additionally on the opening side. In this context, it is also advantageous if a check valve is provided in the pressure line between the first pump element and the 2/2-way directional valve. As soon as the first pump element is switched to circulation, the control pressure provided via the second pump element keeps the 2/2-way directional valve closed against the spring force and the piston rod thus remains in the end position. As soon as the pump device goes into shutdown mode, the 2/2-way directional valve is opened and the working port is relieved to the tank, causing the piston rod of the actuating cylinder or the external hydraulic brake to move to the initial position. It is also conceivable that two or more 2/2-way directional valves are provided to allow the necessary redundancy in the event of a failure of one 2/2-way directional valve.

Preferably, the control line arrangement is connected to the tank via at least one leakage line. The second pump element thus provides the necessary control pressure and supplies the leakage at the leakage line. If the power supply fails or the pump device goes into shutdown mode, the leakage is no longer supplied to the leakage line. The residual pressure in the control line arrangement collapses due to the relief via the leakage line and the valve assembly is no longer hydraulically controlled via the second pump element. The leakage line can be used to ensure that the residual pressure in the control line arrangement collapses quickly. For reasons of redundancy, it is also conceivable that two or more parallel leakage lines are provided.

Preferably, a hydraulic resistor is disposed in the leakage line. The hydraulic resistor can be an orifice or a nozzle, for example. By selecting a suitable hydraulic resistor, the leakage can be set in a selected manner so that, on the one hand, a sufficiently rapid collapse of the residual pressure in shutdown mode is ensured and, on the other hand, too high a leakage does not excessively reduce the efficiency of the hydraulic system.

Preferably, the first pump element is a positive displacement pump and/or the second pump element is a positive displacement pump or a flow pump. Positive displacement pumps are more efficient than centrifugal pumps and achieve higher pressures and a higher power density.

Alternatively, it may be preferably that the valve assembly has a circulation device and the pump device comprises a first pump element. The first pump element may be connected to the valve assembly via a pressure line and the circulation device is configured to connect the pressure line to the tank when a limit pressure is reached at the working port. Preferably, a control line arrangement branches off from the pressure line between the first pump element and the working port at a branch point. Preferably, the control line arrangement is connected to the valve assembly, such that the a pressure in the control line arrangement hydraulically operates the valve assembly to block the connection between the working port and the tank in the operating mode of the pump device Thus, the pump device according to this preferred embodiment only comprises one pump element, which saves costs and space.

Preferably, a preloading element is disposed in the pressure line between the branch point and the working port. The preloading element preferably is a hydraulic resistor or a preloading valve, in particular a preloaded check valve. The hydraulic resistor may be a nozzle or an orifice. The preloading element warrants that a sufficiently high preloading pressure is generated in the pressure line, so that a sufficient pressure can be signaled via the control line arrangement to the valve assembly to block the connection between the working port and the tank. When the pump device is in the shutdown mode, the pressure in the control line arrangement collapses and the valve assembly opens the connection between the working port and the tank.

Preferably, the hydraulic system comprises a lowering brake downstream of the working port in the direction of flow to the tank. In this way, the speed of movement of the piston rod into the initial position can be specifically influenced and defined.

The hydraulic system can preferably comprise an actuating cylinder connected to the working port and having a pressure chamber and a piston rod movable between an initial position and an end position, wherein the pressure chamber of the actuating cylinder can be connected to the pump device or the tank via the valve assembly, and the piston rod moves into the end position when pressure is applied to the pressure chamber via the pump device, and the piston rod moves into the initial position when the pressure chamber is connected to the tank.

Furthermore, the problem is solved with a brake release device comprising a hydraulic system described above. The problem is further solved with a brake system comprising a hydraulic brake connected to the working port.

In the following, the invention is explained in more detail with reference to exemplary embodiments shown in the figures.

DETAILED DESCRIPTION OF THE INVENTION

Figure 1:
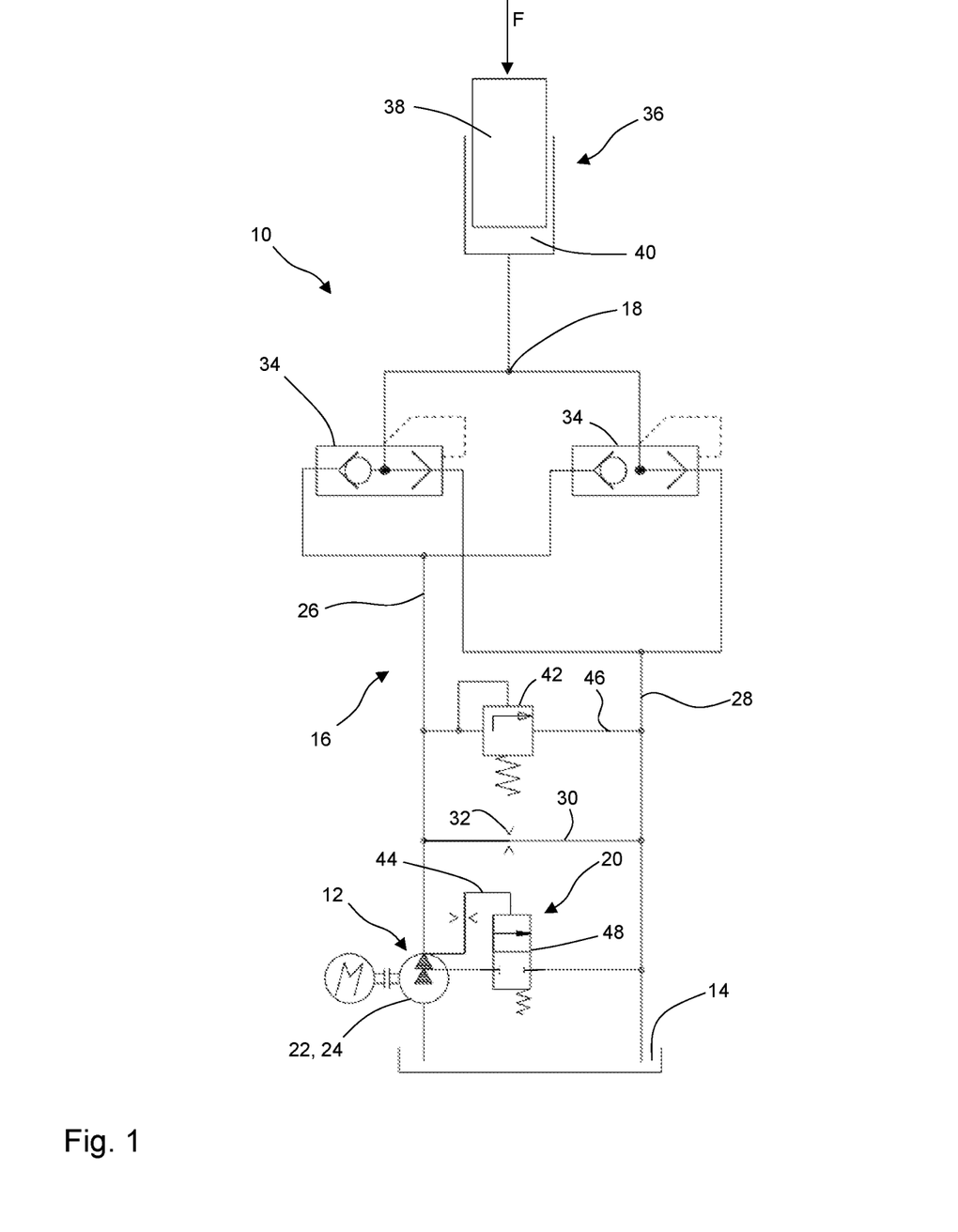
FIG. 1 is a hydraulic circuit diagram of a hydraulic system according to a first embodiment.

FIG. 1 shows a hydraulic circuit diagram of a hydraulic system 10 according to the invention for a brake release device according to a first embodiment. The hydraulic system 10 has a pump device 12 with a first pump element 22 and a second pump element 24. The first pump element 22 and the second pump element 24 are each configured as a positive displacement pump. The first pump element 22 is configured for a higher volume flow than the second pump element 24.

Also provided are a tank 14, a valve assembly 16, and a working port 18. An actuating cylinder 36 is connected to the working port 18 in this embodiment. As shown, a pressure chamber 40 of the actuating cylinder 36 is connected to the working port 18. An axially movable piston rod 38 is provided in the actuating cylinder 36, which can move between an initial position when depressurized and an end position when fully pressurized, against a force F. The force F can be a spring force, for example. When the piston rod 38 is in the end position, a brake not shown here is released via the brake release device.

The pump device 12 includes a motor M and is switchable between an operating mode and a shutdown mode. In the operating mode, the first pump element 22 and the second pump element 24 deliver hydraulic fluid from the tank 14 as the motor M drives the first pump element 22 and the second pump element 24. In shutdown mode, for example due to a power supply failure, the motor M does not drive the first pump element 22 and the second pump element 24 and consequently no hydraulic fluid is delivered.

In this embodiment, the valve assembly 16 has two pressure switches 34 disposed parallel to each other. Of course, only one pressure switch 34 or more than two pressure switches 34 can be provided. The pressure switches 34 are connected to the first pump element 22 and the second pump element 24 via a pressure line 26. When the pressure line 26 is pressurized in the operating mode of the pump device 12, the pressure switches 34 connect the pressure line 16 to the working port 18 so that the pressure chamber 40 is pressurized and the piston rod 38 moves to the end position.

In the shutdown mode of the pump device 12, the force F acts on the piston rod 38 and hydraulic fluid is forced out of the pressure chamber 40 towards the working port 18. The pressure switches 34 are switched and the working port 18 is connected to the tank 14 via a relief line 28 connected to the pressure switches 34.

The pressure line 26 is connected to the relief line 28 via a leakage line 30. A hydraulic resistor 32 is disposed in the leakage line 30, which in this embodiment is configured as an orifice. Furthermore, the pressure line 26 is connected to the relief line 28 via a first connection line 46. A pressure relief valve 42 is arranged in the first connection line 46, which protects the pump device 12.

The valve assembly 16 further comprises a circulation device 20 having a circulation valve 48. The circulation valve 48 is spring-loaded on the closing side. On the opening side, the pressure present in the pressure line 26 is signaled to the circulation valve 48 via a signal line 44. As shown, a hydraulic resistor in the form of an orifice or a nozzle may be disposed in the signal line 44. The circulation device 20 switches the first pump element 22 to recirculation as soon as a predefined limit pressure is present at the working port 18. In this exemplary embodiment, the limit pressure corresponds to the pressure at which the piston rod 38 is in the end position and is held in the end position 38.

The function of the hydraulic system 10 according to the invention is now described below. The pump device 12 is switched to operating mode and the first pump element 22 and the second pump element 24 deliver hydraulic fluid into the pressure line 26. The pressure switches 34 open the connection between the pressure line 26 and the working port 18 so that the pressure chamber 40 is pressurized and the piston rod 38 moves against the force F from the initial position towards the end position. At the same time, the first pump element 22 and the second pump element 24 supply the leakage via the leakage line 30.

As soon as the piston rod 38 is in the end position, the limit pressure set at the circulation device 20 is reached and the first pump element 22 is switched to circulation. The second pump element 24 continues to deliver into the pressure line 26, whereby the second pump element 24 is configured for a smaller volume flow than the first pump element 24. The pressure provided through the second pump element 24 is sufficient to supply the leakage through the leakage line 30, to maintain the pressure switches 34 in the position where the pressure line 26 is connected to the work port 18, and to maintain the piston rod 38 in the end position.

For example, when the pump device 12 goes into shutdown mode due to a failure of the power supply, the second pump element 24 no longer delivers to the pressure line 26 and the leakage at the leakage line 30 is no longer supplied. The pressure present in pressure line 26 collapses and is relieved through the leakage line 30. The piston rod 38 moves in the direction of the initial position due to the force F and forces hydraulic fluid out of the pressure chamber 40 via the working port 18 to the pressure switches 34. The pressure switches 34 are switched accordingly so that the working port 18 is connected to the tank via the relief line 28 and the pressure chamber 40 is thus relieved. This results in a purely hydraulic fail-safe principle of the hydraulic system 10.

The leakage line 30 can be omitted if the second pump element 22 has internal leakage. In other words, if the second pump element 22 allows hydraulic fluid to flow from the pressure line 26 to the tank 14 in shutdown mode, leakage can also be routed via this.

Figure 2:
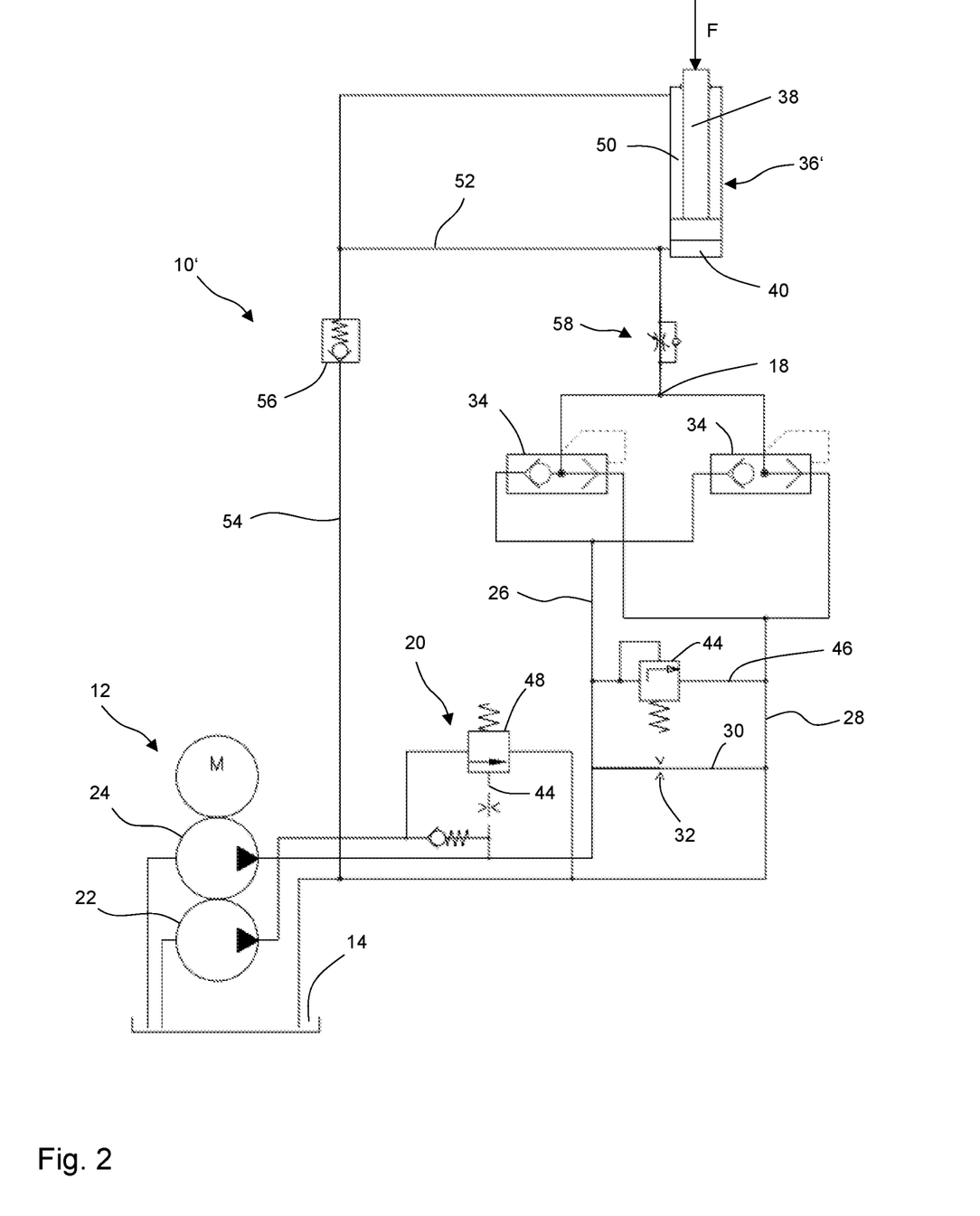
FIG. 2 is a hydraulic circuit diagram of a hydraulic system according to a second embodiment.

FIG. 2 shows a hydraulic circuit diagram of a hydraulic system 10' according to the invention for a brake release device according to a second embodiment. The hydraulic system 10' according to the second embodiment differs from the hydraulic system 10 according to the first embodiment shown in FIG. 1 essentially by an actuating cylinder 36' configured as a double-acting cylinder and a lowering brake 58 disposed between the pressure chamber 40 and the working port 18.

The actuating cylinder 36' comprises a rod chamber 50, which is connected to the working port 18 and the pressure chamber 40 via a second connecting line 52. Furthermore, a suction line 54 opens into the connecting line 50 between the rod chamber 50 and the working port 18. A suction valve 56 is disposed in the suction line 54. As shown, the suction line 54 opens into the relief line 28.

The lowering brake 58 is only active in the flow direction from the pressure chamber 40 to the working port 18, but not in the flow direction from the working port 18 to the pressure chamber 40. Consequently, a defined lowering speed can be achieved via the lowering brake 58.

When the pressure line 26 is pressurized in the operating mode of the pump device 12, the piston rod 38 is moved toward the end position and hydraulic fluid is forced from the rod chamber 50 directly into the pressure chamber 40 via the second connection line 52. The suction valve 56 blocks the suction line 54. When the pump device 12 is in the shutdown mode, the piston rod 38 moves toward the initial position due to the force F, with a difference in hydraulic fluid being sucked as needed through the suction line 54 and the suction valve 56.

Figure 3:
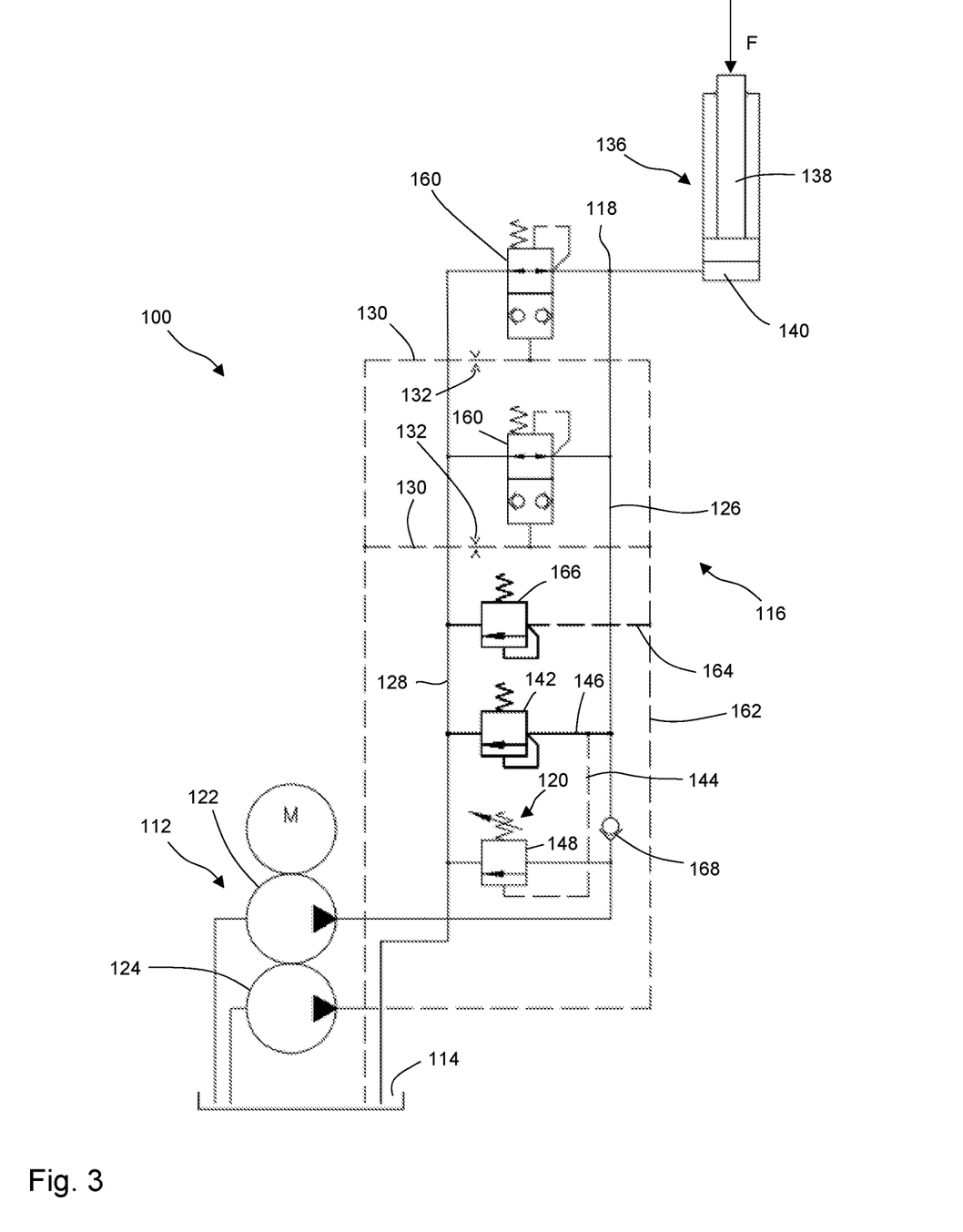
FIG. 3 is a hydraulic circuit diagram of a hydraulic system according to a third embodiment.

FIG. 3 shows a hydraulic circuit diagram of a hydraulic system 100 according to the invention for a brake release device according to a third embodiment. In this embodiment, a pump device 112 is provided with a first pump element 122 and a second pump element 124. In contrast to the first embodiment, in the hydraulic system 100 according to the third embodiment there is a working circuit and a control circuit separate therefrom.

The first pump element 122 is connected to the working port 118 via a pressure line 126 and supplies the working circuit. An actuating cylinder 136 having a pressure chamber 140 and a piston rod 138 is connected to the working port 118. The actuating cylinder 136 corresponds to the actuating cylinder 36 of the first embodiment.

In this embodiment, the valve assembly 116 has two 2/2-way directional valves 160 connected in parallel to connect the pressure line 126 to the relief line 128 or to block this connection. Of course, only one 2/2-way directional valve 160 or more than two 2/2-way directional valves 160 may be used. The relief line 128 is connected to the tank 114 in a conventional manner.

Further, the valve assembly 116 includes a circulation device 120 having a circulation valve 148 and a check valve 168 disposed in the pressure line 126. A signal line 144 branches off from the pressure line 126 upstream of the check valve 168. The pressure in the signal line 144 is signaled on the opening side to the circulation valve 120. On the closing side, an adjustable spring acts on the circulation valve 120. The adjustable spring is used to set a limit pressure at which the circulation device 120 switches the first pump element 122 to circulation. The limit pressure set at the circulation valve 148 corresponds to the pressure at which the piston rod 138 is held in the end position.

A first connection line 146 connects the pressure line 126 to the relief line 128. A pressure relief valve 142 is disposed in the first connection line 146 to provide relief to the first pump element 122.

The second pump element 124 is connected to a control line arrangement 162, and thus supplies the control circuit. The pressure in the control line arrangement 162 is signaled to the closing side to the 2/2 directional control valves 160 against a spring acting on the opening side and the pressure in the pressure line 126 acting on the opening side. The control line arrangement 162 further includes a leakage line 130 connected to the tank 114 for each of the two 2/2-way directional valves 160. A hydraulic resistor 132, such as an orifice, is disposed in each of the two leakage lines 130. Consequently, the second pump element 124 also supplies the leakage through the leakage lines 130. A third connection line 164 branches off from the control line arrangement 162 downstream of the leakage lines 130. The third connection line 164 connects the control line arrangement 162 to the relief line 128. A pressure relief valve 166 is disposed in the third connection line 164, which protects the second pump element 124.

The function of the hydraulic system 100 according to the third embodiment of the invention is now described in the following. The pump device 112 is switched to the operating mode and the first pump element 122 delivers hydraulic fluid into the pressure line 126. The second pump element 124 delivers hydraulic fluid into the control line arrangement 162.

Due to the control pressure in the control line arrangement 162, the 2/2-way directional valves 160 are closed so that the pressure chamber 140 is pressurized via the pressure line 126 and the piston rod 138 is moved from the initial position against the force F to the end position. As soon as the piston rod 138 is in the end position, the circulation valve 148 opens and the first pump element 122 is switched to circulation. The locked-in pressure upstream of the check valve 168 corresponds to the limit pressure and holds the piston rod 138 in the end position.

The second pump element 124 supplies the leakage at the leakage lines 130 and keeps the 2/2-way directional valves 160 closed. Provided that the pump device 112 switches to shutdown mode, for example due to a power supply failure, the pressure in the control line arrangement 162 collapses due to the leakage via the leakage lines 130 no longer being supplied. The 2/2-way directional valves 160 open and the working port 118 or pressure chamber 140 is connected to the relief line 128. The pressure chamber 140 is thus relieved to the tank 114 and the piston rod 138 moves from the end position to the initial position. This results in a purely hydraulic fail-safe principle of the hydraulic system 100.

Figure 4:
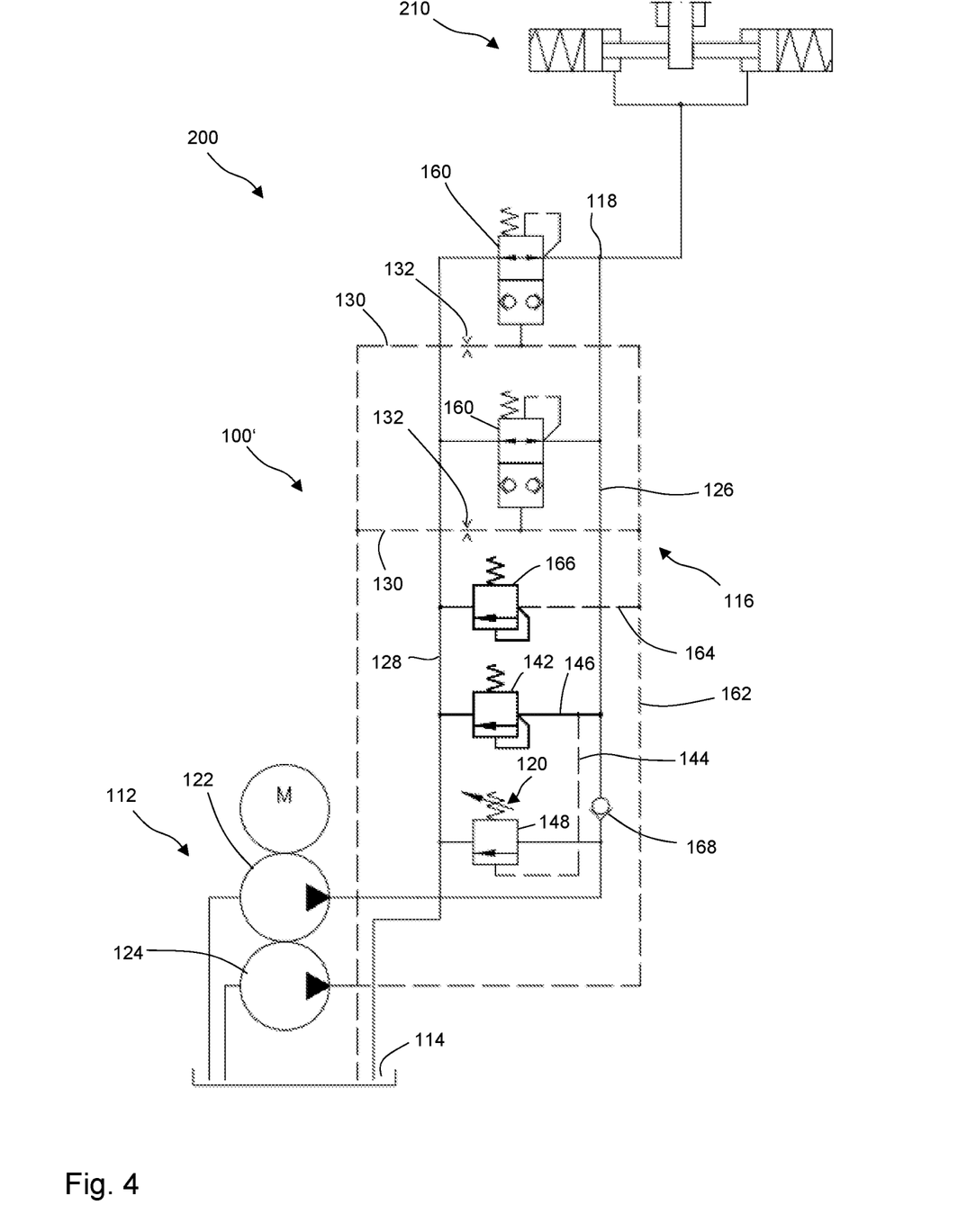
FIG. 4 is a hydraulic circuit diagram of a brake system with a hydraulic system according to a fourth embodiment.

FIG. 4 shows hydraulic circuit diagram of a brake system 200 with a hydraulic system 100' according to a fourth embodiment. The hydraulic system 100' largely corresponds to the hydraulic system 100 shown in FIG. 3 with the difference that no actuating cylinder is connected to the working port 118. Rather, an external hydraulic brake 210 is connected to the working port 118 in this case.

The function of the hydraulic system 100' shown in FIG. 4 corresponds to that of the hydraulic system 100 shown in FIG. 3, although a limit pressure suitable for the external hydraulic brake 210 must be set accordingly at the circulation valve 148.

Figure 5:
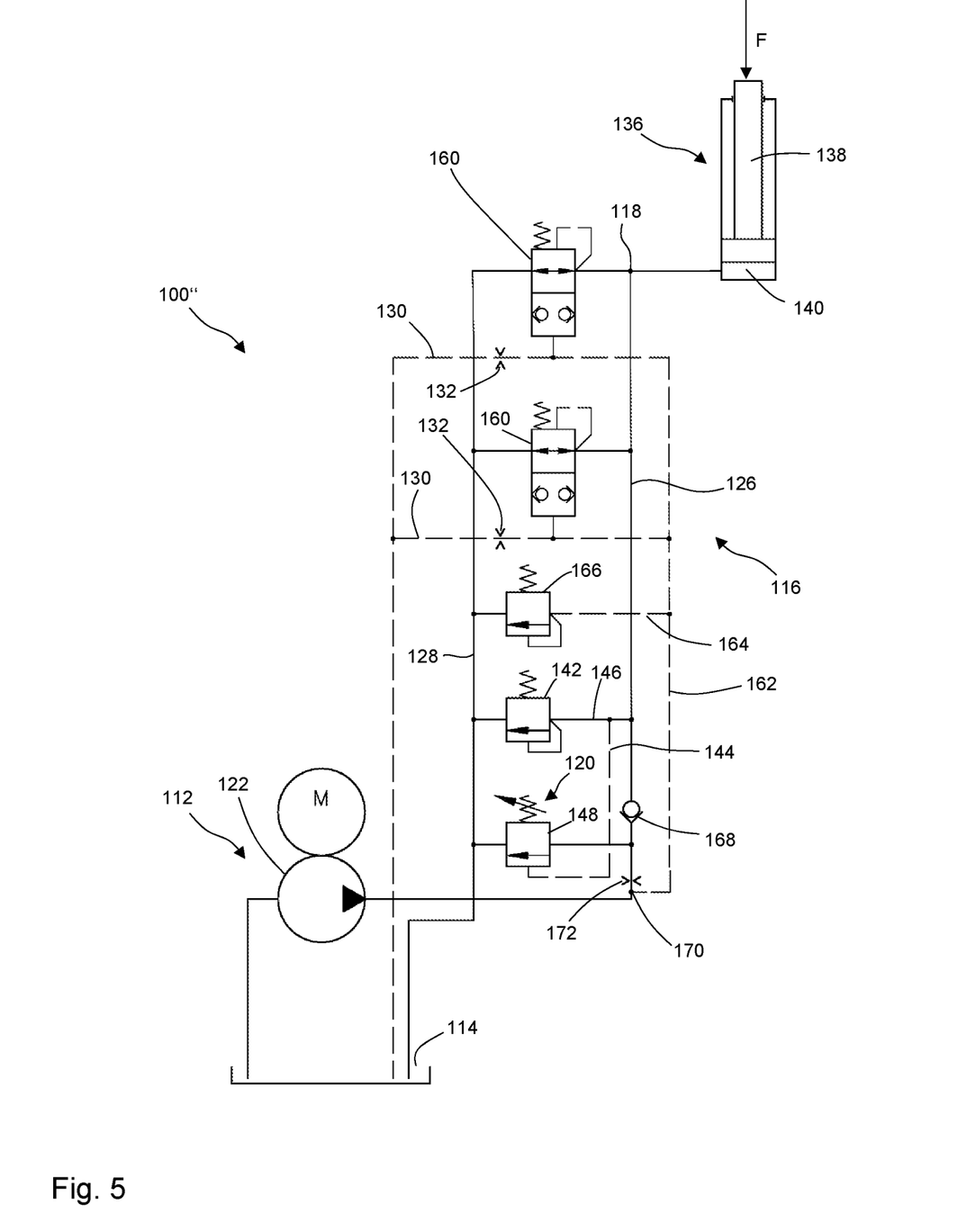
FIG. 5 is a hydraulic circuit diagram of a hydraulic system according to a fifth embodiment.

FIG. 5 shows a hydraulic circuit diagram of a hydraulic system 100" according to a fifth embodiment. The hydraulic system 100" largely corresponds to the hydraulic system 100 shown in FIG. 3 with the difference that the pump device 112 comprises only one pump element 122, i.e. a first pump element 122. In addition, the control line arrangement 162 branches off from the pressure line 126 at a branch point 170. The branch point 170 is disposed downstream of the pump device 112 and upstream of the working port 118. In particular, the branch point 170 is disposed between the pump device 112 and the working port 118, in particular between the pump device 112 and the check valve 168. In addition, a preloading element 172 is disposed in the pressure line 126 between the branch point 170 and the working port 118. As shown, the preloading element 172 is disposed downstream of the check valve 168. In this embodiment, the preloading element 172 is a hydraulic resistor e.g., an orifice.

The preloading element 172 warrants that a sufficient pressure in the control line arrangement 162 is signaled to the closing side to the 2/2 directional control valves 160, so that the connection between the working port 118 and the tank 114 is blocked when the pump device 112 is in the operating mode. Of course, the size of the hydraulic resistor 172 is chosen to keep the energy loss as minimal as possible. When the pump device 112 switches in the shutdown mode, the pressure in the control line arrangement 162 collapses, as the residual pressure is relieved to the tank 114 via the leakage lines 130. The 2/2 directional control valves 160 open and the working port 118 is connected to the tank 114 so that the piston rod 138 moves from the end position to the initial position. This results in a purely hydraulic fail-safe principle of the hydraulic system 100" according to the fifth embodiment.

Figure 6:
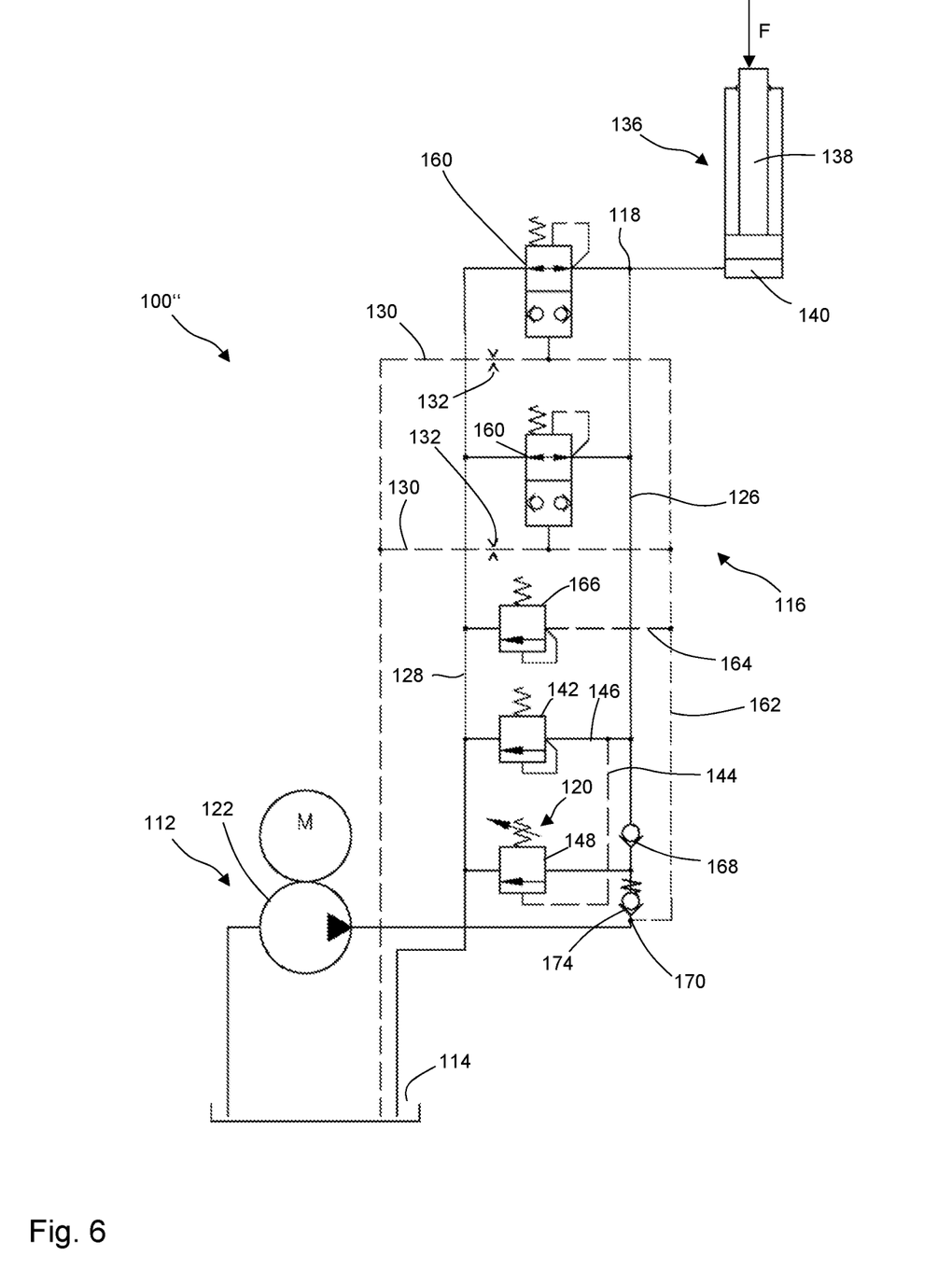
FIG. 6 is a modified hydraulic circuit diagram of a hydraulic system according to the embodiment.

FIG. 6 depicts a modified hydraulic circuit diagram of a hydraulic system 100" according to the fifth embodiment. Here, the preloading element is a preloaded check valve 174 which also warrants a sufficient pressure in the control line arrangement 162.

LIST OF REFERENCE SIGNS 10, 10', 100, 100', 100" hydraulic system
12, 112 pump device
14, 114 tank
16, 116 valve assembly
18, 118 working port
20, 120 circulation device
22, 122 first pump element
24, 124 second pump element
26, 126 pressure line
28, 128 relief line
30, 130 leakage line
32, 132 hydraulic resistor
34 pressure switch
36, 36', 136 actuating cylinder
38, 138 piston rod
40, 140 pressure chamber
42, 142 pressure relief valve
44, 144 signal line
46, 146 first connection line
48 circulation valve
50 rod chamber
52 second connection line
54 suction line
56 suction valve
58 lowering brake
160 2/2-way directional valve
162 control line arrangement
164 third connection line
166 pressure relief valve
168 check valve
170 branch point
172 preloading element
174 preloaded check valve
200 brake system
F Force
M Motor

The invention claimed is:

1. A hydraulic system for a brake release device or brake system, the hydraulic system comprising:
a pump device comprising a first pump element and a second pump element;
a tank;
a valve assembly that is only hydraulically operable, the valve assembly comprising a circulation device; and
at least one working port, wherein the at least one working port is connectable to the tank or the pump device via the valve assembly,
wherein the pump device is switchable between an operating mode and a shutdown mode,
wherein the valve assembly is switchable at least partially by a pressure at the at least one working port to fluidly couple the at least one working port to the tank in the shutdown mode,
wherein the valve assembly is switched by a pressure delivered by the pump device to fluidly couple the at least one working port to the pump device in the operating mode, and
wherein the circulation device connects the first pump element of the pump device to the tank when a limit pressure is reached at the at least one working port, and the second pump element hydraulically controls the valve assembly such that the limit pressure at the at least one working port is maintained when the first pump element of the pump device is connected to the tank by the circulation device.

2. The hydraulic system according to claim 1, wherein the second pump element is connected to the tank via at least one leakage point.

3. The hydraulic system according to claim 1, wherein the first pump element and the second pump element are connected to the valve assembly via a common pressure line.

4. The hydraulic system according to claim 3, wherein the valve assembly is connected to the tank via a relief line, the common pressure line being connected to the relief line via at least one leakage line.

5. The hydraulic system according to claim 4, wherein a hydraulic resistor is disposed in the leakage line.

6. The hydraulic system according to claim 1, wherein the valve assembly comprises at least one hydraulically operable pressure switch, wherein the at least one hydraulically operable pressure switch connects the pump device to the at least one working port in the operating mode and wherein the at least one hydraulically operable pressure switch connects the at least one working port to the tank in the shutdown mode.

7. The hydraulic system according to claim 1, wherein the first pump element is connected to the valve assembly via a pressure line, and the second pump element is connected to the valve assembly via a control line arrangement.

8. The hydraulic system according to claim 7, wherein the valve assembly comprises at least one 2/2-way directional valve for connecting the at least one working port to the tank, the 2/2-way directional valve being connected on a closing side to the control line arrangement and being spring-loaded on an opening side.

9. The hydraulic system according to claim 7, wherein the control line arrangement is connected to the tank via at least one leakage line.

10. The hydraulic system according to claim 1, wherein the first pump element is a positive displacement pump and/or the second pump element is a positive displacement pump or a flow pump.

11. The hydraulic system according to claim 1, further comprising a lowering brake downstream of the at least one working port in a direction of flow to the tank.

12. The hydraulic system according to claim 1, further comprising an actuating cylinder connected to the at least one working port and comprising a pressure chamber and a piston rod movable between an initial position and an end position,
   wherein the pressure chamber of the actuating cylinder is connected via the valve assembly to the pump device or the tank, and the piston rod moves into the end position when the pressure chamber is pressurized via the pump device, and the piston rod moves into the initial position when the pressure chamber is connected to the tank.

13. A brake release device comprising the hydraulic system according to claim 1.

14. A brake system comprising a hydraulic brake and the hydraulic system according to claim 1, wherein the hydraulic brake is connected to the at least one working port.

15. A hydraulic system for a brake release device or brake system, the hydraulic system comprising:
   a pump device comprising a first pump element;
   a tank;
   a valve assembly that is only hydraulically operable, the valve assembly comprising a circulation device; and
   at least one working port connectable to the tank or the pump device via the valve assembly,
   wherein the pump device is switchable between an operating mode and a shutdown mode,
   wherein the valve assembly is switchable at least partially by a pressure at the at least one working port to fluidly couple the at least one working port to the tank in the shutdown mode,
   wherein the valve assembly is switched by a pressure delivered by the pump device to fluidly couple the at least one working port to the pump device in the operating mode,
   wherein the first pump element is connected to the valve assembly via a pressure line,
   wherein the circulation device connects the pressure line to the tank when a limit pressure is reached at the at least one working port, and
   wherein a control line arrangement branches off from the pressure line between the first pump element and the at least one working port at a branch point, wherein the control line arrangement is connected to the valve assembly, such that a pressure in the control line arrangement hydraulically operates the valve assembly to block a connection between the at least one working port and the tank in the operating mode of the pump device.

16. The hydraulic system according to claim 15, wherein a preloading element is disposed in the pressure line between the branch point and the at least one working port, wherein the preloading element is a hydraulic resistor or a preloaded check valve.

* * * * *